US007836115B1

(12) United States Patent
Achlioptas

(10) Patent No.: US 7,836,115 B1
(45) Date of Patent: *Nov. 16, 2010

(54) SYSTEM AND METHOD ADAPTED TO FACILITATE DIMENSIONAL TRANSFORM

(75) Inventor: Dimitris Achlioptas, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 753 days.

This patent is subject to a terminal disclaimer.

(21) Appl. No.: 11/257,434

(22) Filed: Oct. 24, 2005

Related U.S. Application Data

(63) Continuation of application No. 10/086,309, filed on Mar. 1, 2002, now Pat. No. 7,043,514.

(51) Int. Cl.
*G06F 17/14* (2006.01)
(52) U.S. Cl. ...................................... 708/401
(58) Field of Classification Search ................. 708/400, 708/401
See application file for complete search history.

(56) References Cited

U.S. PATENT DOCUMENTS

| | | | |
|---|---|---|---|
| 5,647,058 A | | 7/1997 | Agrawal et al. |
| 5,832,044 A | * | 11/1998 | Sousa et al. .................. 375/347 |
| 6,032,146 A | | 2/2000 | Chadha et al. |
| 6,122,628 A | | 9/2000 | Castelli et al. |
| 6,134,541 A | | 10/2000 | Castelli et al. |
| 6,134,555 A | | 10/2000 | Chadha et al. |
| 6,360,019 B1 | * | 3/2002 | Chaddha ..................... 382/253 |
| 6,505,207 B1 | | 1/2003 | Aggarwal et al. |
| 6,987,959 B1 | * | 1/2006 | Correia et al. ........... 455/277.1 |
| 7,318,078 B1 | * | 1/2008 | Achlioptas ................... 708/203 |

OTHER PUBLICATIONS

Dimitris Achlioptas, Database-Friendly Random Projections, Journal of Computer and Syststems Science, Jun. 2003, 671-687, vol. 66 Issue 4.
Wolfram Research, Euclidean Space, http://mathworld.wolfram.com/EuclideanSpace.html, last viewed on May 11, 2005.

(Continued)

*Primary Examiner*—Chuong D Ngo
(74) *Attorney, Agent, or Firm*—Lee & Hayes, PLLC

(57) ABSTRACT

Systems and methods that facilitate dimensional transformations of data points are disclosed. In particular, the subject invention provides for a system and methodology that simplifies dimensional transformations while mitigating variations of a distance property between pairs of points. A set of n data points in d dimensional space is represented as an n×d input matrix, where d also corresponds to the number of attributes per data point. A transformed matrix represents the n data points in a lower dimensionality k after being mapped. The transformed matrix is an n×k matrix, where k is the number of attributes per data point and is less than d. The transformed matrix is obtained by multiplying the input matrix by a suitable projection matrix. The projection matrix is generated by randomly populating the entries of the matrix with binary or ternary values according to a probability distribution. Unlike previous methods, the projection matrix is formed without obtaining an independent sample from a Gaussian distribution for each entry in the projection matrix, without applying a linear algebraic technique to generate the projection matrix and without employing arbitrary floating point numbers. Processes and/or algorithms can utilize the reduced transformed matrix instead of the larger input matrix to facilitate computational efficiency and data compression.

20 Claims, 13 Drawing Sheets

OTHER PUBLICATIONS

Johnson, et al., "Extensions of Lipschitz mappings into a Hilbert space," Contemporary Mathematics, 1984, pp. 189-206, vol. 26.

P. Frankl, et al., "The Johnson-Lindenstrauss Lemma and Sphericity of Some Graphs," Journal of Combinatorial Theory, 1988, pp. 355-362, Series B 44.

Sanjeev Arora, et al:, "Learning Mixtures of Arbitrary Gaussians," 2001, pp. 247-257.

Sanjoy Dasgupta, "Learning Mixtures of Gaussians," 1999.

Sanjoy Dasgupta, et al., "An elementary proof of the Johnson-Lindenstrauss Lemma," Mar. 1999, pp. 1-5.

Piotr Indyk, "Stable Distributions, Pseudorandom Generators, Embeddings and Data Stream Computation," 2000, pp. 1-9.

Piotr Indyk, et al., "Approximate Nearest Neighbors: Towards Removing the Curse of Dimensionality," 1998, pp. 604-613.

Jon M. Kleinberg, "Two Algorithms for Nearest-Neighbor Search in High Dimensions," 1997, pp. 599-608.

Nathan Linial, et al., "The geometry of graphs and some of its algorithmic applications," 1995, pp. 1-26.

Christos H. Papadimitriou, et al., "Latent Semantic Indexing: A Probabilistic Analysis," Nov. 14, 1997, pp. 1-15.

Leonard J. Schulman, "Clustering for edge-Cost Minimization," 2000, pp. 1-31.

Santosh Vempala, "A Random Sampling based Algorithm for Learning the Intersection of Half-spaces," 1997.

Alan Frieze, et al., "Fast Monte-Carlo Algorithms for finding low-rank approximations," Oct. 22, 1998.

Samuel Kaski, "Dimensionality Reduction by Random Mapping: Fast Similarity Computation for Clustering," May 4, 1998, pp. 413-418.

\* cited by examiner $$[A_d] \times [R_k] = [T_k]$$

FIG. 2

$$\underset{n=4}{\underset{d=3}{\begin{bmatrix} a_{11} & a_{12} & a_{1d} \\ a_{21} & a_{22} & a_{2d} \\ a_{31} & a_{32} & a_{3d} \\ a_{n1} & a_{n2} & a_{nd} \end{bmatrix}}} \times \underset{d=3}{\begin{bmatrix} r_{11} & r_{1k} \\ r_{21} & r_{2k} \\ r_{d1} & r_{dk} \end{bmatrix}}^{k=2} = \underset{n=4}{\begin{bmatrix} t_{11} & t_{1k} \\ t_{21} & t_{2k} \\ t_{31} & t_{3k} \\ t_{n1} & t_{nk} \end{bmatrix}}^{k=2}$$

$t_{11} = a_{11}r_{11} + a_{12}r_{21} + \ldots + a_{1d}r_{d1}$
$t_{1k} = a_{11}r_{1k} + a_{12}r_{2k} + \ldots + a_{1d}r_{dk}$
$t_{21} = a_{21}r_{11} + a_{22}r_{21} + \ldots + a_{2d}r_{d1}$
$t_{2k} = a_{21}r_{1k} + a_{22}r_{2k} + \ldots + a_{2d}r_{dk}$
$t_{31} = a_{31}r_{11} + a_{32}r_{21} + \ldots + a_{3d}r_{d1}$
$t_{3k} = a_{31}r_{1k} + a_{32}r_{2k} + \ldots + a_{3d}r_{dk}$
$t_{n1} = a_{n1}r_{11} + a_{n2}r_{21} + \ldots + a_{nd}r_{d1}$
$t_{nk} = a_{n1}r_{1k} + a_{n2}r_{2k} + \ldots + a_{nd}r_{dk}$

FIG. 3

$$\begin{bmatrix} 5 & 7 & 3 & 2 & 4 & 6 \\ 1 & 4 & 9 & 7 & 2 & 8 \\ 2 & 5 & 6 & 3 & 7 & 4 \end{bmatrix} \times \begin{bmatrix} 1 & 0 & 1 & 0 & 0 & 0 & 0 \\ 1 & 0 & 0 & 0 & 0 & 0 & 0 \\ 0 & 1 & 0 & 0 & 0 & 0 & 0 \\ 0 & 0 & 0 & 0 & 0 & 0 & 0 \\ -1 & 0 & -1 & 0 & 0 & 0 & 0 \\ -1 & -1 & 0 & 0 & 0 & 0 & 0 \end{bmatrix} =$$

$$\begin{bmatrix} 5+0+3+0+-4+-6 & 0+0+0+0+0+0 & 5+0+0+0+-4+0 & 0+0+0+0+0+0 & 0+0+0+0+0+0 & 0+0+0+0+0+0 & 0+0+0+0+0+0 \\ 1+0+9+0+-2+-8 & 0+0+0+0+0+0 & 1+0+0+0+-2+0 & \cdots & & & \\ 2+0+6+0+-7+-4 & 0+0+0+0+0+0 & 2+0+0+0+-7+0 & & & & \end{bmatrix}$$

$$= \begin{bmatrix} -2 & -6 & 5 & 1 & \cdots \\ 0 & -8 & 1 & \cdots & \\ -3 & -4 & 2 & & \end{bmatrix}$$

$$501: \quad n=3 \begin{bmatrix} 5 & 7 & 3 & 2 & 4 & 6 \\ 1 & 4 & 9 & 7 & 2 & 8 \\ 2 & 5 & 6 & 3 & 7 & 4 \end{bmatrix} \; d=6$$

$$\times \quad 502: \quad d=6 \begin{bmatrix} -1 & 1 & 1 & -1 & 1 & -1 \\ -1 & -1 & 1 & 1 & -1 & 1 \\ 1 & 1 & -1 & 1 & 1 & -1 \end{bmatrix} \; k=3$$

$$504: \begin{bmatrix} -5+ & 7+ & 3+ & -2+ & 4+ & -6 \\ -1+ & -4+ & 9+ & 7+ & -2+ & 8 \\ -2+ & -5+ & 6+ & -3+ & 7+ & -4 \\ & & & & & \\ -5+ & -7+ & 3+ & 2+ & -4+ & 6 \\ -1+ & -4+ & 9+ & 7+ & -2+ & 8 \\ -2+ & -5+ & 6+ & 3+ & -7+ & 4 \\ & & & & & \\ 5+ & 7+ & -3+ & 2+ & 4+ & -6 \\ 1+ & 4+ & -9+ & 7+ & 2+ & -8 \\ 2+ & 5+ & -6+ & 3+ & 7+ & -4 \end{bmatrix}$$

$$= \quad 503: \quad n=3 \begin{bmatrix} -5 & -9 & 9 \\ 17 & -25 & -3 \\ -1 & -9 & 7 \end{bmatrix} \; k=3$$

FIG. 5

$$\underset{n=3}{\underset{\uparrow}{601}} \begin{bmatrix} 5 & 7 & 3 & 2 & 4 & 6 \\ 1 & 4 & 9 & 7 & 2 & 8 \\ 2 & 5 & 6 & 3 & 7 & 4 \end{bmatrix} \times \underset{d=6}{\begin{bmatrix} 1 & 1 & 1 \\ 1 & 1 & 1 \\ 1 & 1 & 1 \\ 1 & -1 & -1 \\ -1 & -1 & -1 \\ -1 & -1 & -1 \\ -1 & -1 & -1 \end{bmatrix}}^{k=3} = \underset{602}{}$$

$$\begin{bmatrix} 5+ & 7+ & 3+ & -2+ & -4+ & -6 \\ 1+ & 4+ & 9+ & -7+ & -2+ & -8 \\ 2+ & 5+ & 6+ & -3+ & -7+ & -4 \end{bmatrix} \begin{bmatrix} 5+ & 7+ & 3+ & -2+ & -4+ & -6 \\ 1+ & 4+ & 9+ & -7+ & -2+ & -8 \\ 2+ & 5+ & 6+ & -3+ & -7+ & -4 \end{bmatrix} \begin{bmatrix} 5+ & 7+ & 3+ & -2+ & -4+ & -6 \\ 1+ & 4+ & 9+ & -7+ & -2+ & -8 \\ 2+ & 5+ & 6+ & -3+ & -7+ & -4 \end{bmatrix}$$

$$= \underset{n=3}{\underset{\uparrow}{603}} \begin{bmatrix} 3 & 3 & 3 \\ -3 & -3 & -3 \\ -1 & -1 & -1 \end{bmatrix}^{k=3}$$

$$\underset{604}{\underset{\uparrow}{}} \begin{bmatrix} 5+ & 7+ & 3+ & -2+ & -4+ & -6 \\ 1+ & 4+ & 9+ & -7+ & -2+ & -8 \\ 2+ & 5+ & 6+ & -3+ & -7+ & -4 \end{bmatrix}$$

FIG. 6

SYSTEM AND METHOD ADAPTED TO FACILITATE DIMENSIONAL TRANSFORM

CROSS-REFERENCE TO RELATED APPLICATIONS

This application is a continuation of U.S. patent application Ser. No. 10/086,309, filed Mar. 1, 2002 now U.S. Pat. No. 7,043,514, and entitled, "SYSTEM AND METHOD ADAPTED TO FACILITATE DIMENSIONAL TRANSFORM." The entirety of the aforementioned application is incorporated by reference. This application is also related to U.S. patent application Ser. No. 11/074,547, filed Mar. 8, 2005 now U.S. Pat. No. 7,318,078, and entitled, "SYSTEM AND METHOD ADAPTED TO FACILITATE DIMENSIONAL TRANSFORM."

TECHNICAL FIELD

The present invention relates generally to data manipulation and, and more particularly to a system and method adapted to facilitate dimensional transformations of data pointsets in Euclidean space.

BACKGROUND OF THE INVENTION

The amount of information available via computers has dramatically increased with the wide spread proliferation of computer networks, the Internet and digital storage means. With the increased amount of information has come the need to manage, sort-through and selectively access data to facilitate efficient utilization and manipulation of information.

Much of the information generated today can be organized into matrices or data tables. By way of example, online consumer transactions can be organized into a matrix, where rows of the matrix correspond to individual consumers and columns of the matrix correspond to consumers or transactional attributes (e.g., points of purchase, zip codes). Often, such information can be represented as a pointset in Euclidean space, where the dimensionality of the pointset corresponds to a number of coordinates (e.g., attributes) that identifies or locates the points in the space.

Euclidean space is a type of metric space that can have an arbitrary number of dimensions. For example, common everyday space has three dimensions. On the other hand, Euclidean spaces, such as that which may be representative of one or more data processing applications, can have hundreds of thousands of dimensions and many millions of corresponding data points. In such situations, it is often desirable to map the original set of points into a new set of equally many points, residing in a lower dimensional Euclidean space. By mapping the original points to a lower dimensional space, a benefit of data compression is obtained since fewer attributes are required to represent each point. As such, storage requirements and processing capabilities can be significantly reduced. At the same time, though, it is understood that, in general, the new representation cannot perfectly capture all information present in the original, high-dimensional representation.

As an example, one common technique for mapping data to a lower dimensional space is to project the original data on the hyperplane spanned by the eigenvectors corresponding to the k largest singular values of the original data. While such projections have a number of useful properties, they may fail to preserve distances between data points, referred to as a pairwise distance property. That is, pairs of points represented in the lower dimensionality may have distances significantly different from their distances in the original dimensional space. Therefore, algorithms that look to pairwise distances properties as input data can not benefit from this type of mapping as inconsistent results may occur.

As such, it may be desirable to maintain pairwise distance properties so that, for every pair of points, their distance in low dimensional space substantially approximates their distance in high dimensional space. The reason that such a property may be important is that many data processing algorithms are not concerned with other structural properties of the data beyond interpoint distances. As a result, by applying a distance-preserving dimensionality reduction before applying such algorithms a benefit of compression is obtained while the produced results are consistent with the results that the algorithms would give if they were applied to the original high-dimensional data. Besides the compression benefit, by running at a lower dimensional space, many algorithms perform significantly faster than if executed in the original higher dimensional space.

By way of example, such embeddings are useful in solving an $\epsilon$-approximate nearest neighbor problem, where (after some preprocessing of a pointset P) an answer is given to queries such as, given an arbitrary point x, find a point y∈P, such that for every point $z \in P, ||x-z|| \geq (1-\epsilon)||x-||$. Additionally, such embeddings are useful as part of an approximation algorithm for a version of clustering where it is sought to minimize sum of squares of intra cluster distances. Such embeddings can also be useful in data-stream" computations, where there is limited memory and only a single pass over the data (stream) is allowed.

One approach to performing a transformation that preserves the pairwise distance property is to represent the original data points as an input matrix and to multiply that matrix with a projection matrix R in order to generate a transformed matrix T representative of the transformed or mapped set of data points. The input matrix can be thought of as a set of n points in d dimensional Euclidean space represented as an n×d matrix A where each data point is represented as a row (vector) having d attributes (coordinates). The transformed matrix has the same number of n data points as the input matrix, but has a reduced number of attributes (e.g., k attributes) and thus can be represented as an n×k matrix. Processes and/or algorithms can utilize the transformed matrix instead of the input matrix, thereby increasing computational efficiency.

However, establishing a suitable projection matrix R and multiplying it by the input matrix A can be non-trivial, particularly in many practical computational environments where a very large number of data points and corresponding attributes may exist. For instance, developing the projection matrix R typically includes generating a random number for each entry in the matrix (e.g., Gaussian mean of zero and variance of one), truncating the entries to about five to ten digits, and applying a linear algebraic transformation to the entries to make the columns of the projection matrix orthonormal. This is often an arduous task since the projection matrix can be very large. Then, to perform the matrix multiplication of A by R, substantial computations have to be performed. For example, to transform a million data points in ten thousand dimensional space into a smaller dimensional space (e.g., one thousand dimensional space), a million rows, each having ten thousand columns, have to be multiplied by a matrix having ten thousand rows and one thousand columns.

Although the aforementioned approach preserves a pairwise distance property, such approach has deficiencies (e.g., a sample of the Gaussian distribution is needed for each entry in R; linear algebra techniques are required to obtain the projection matrix R, the resulting projection matrix R is a dense matrix composed of arbitrary floating point numbers, very few of which are 0, making computations numerous and complicated). Accordingly, a more elegant solution to generating a suitable projection matrix in a computationally efficient manner is desired.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to a system and method that facilitates mapping or transforming data point sets from a high dimensionality to a lower dimensionality while mitigating variations in, and preserving a pairwise distance property. The present invention accomplishes such mappings in manners that are simpler and faster than conventional techniques, while providing comparable results. In particular, a projection matrix is produced more efficiently and is utilized to effect such transformation in a computationally efficient and less complex manner than conventional techniques.

Generally, a set of n data points is represented as an n×d input matrix, where d is a number of attributes per data point and is also the number of columns. A transformed matrix T represents the n data points, in a lower dimension than the input matrix, after being mapped or transformed from the input matrix. It is appreciated that this transformation maintains a pairwise distance property between any two of the set of data points. The transformed matrix is obtained by multiplying the input matrix by a projection matrix. This multiplication projects the data points from a higher dimensional representation (the input matrix) into a lower dimensional representation (the transformed matrix). The projection matrix is randomly populated with binary, {−1,+1}, or ternary {−1,0,+1} values, in each case according to a simple probability distribution. After this population is completed the matrix can be used immediately, without any further linear algebraic manipulations. The projection matrix is thus generated without obtaining an independent sample from a Gaussian distribution for each entry in the projection matrix, without applying a linear algebraic technique and without employing arbitrary floating point numbers. The transformed matrix is represented as an n×k matrix, where n is the number of data points and k is the number of attributes per data point, and where k is less than the number of attributes in the original dimensionality d.

In accordance with an aspect of the present invention, a probability distribution for the randomly generated entries populating the projection matrix utilized to reduce dimensionality of a data set is: −1 with probability 1/6; 0 with probability 2/3; and +1 with probability 1/6. In another embodiment, the probability distribution is: −1 with probability 1/2 and +1 with probability 1/2.

In accordance with another aspect of the present invention, a system that dimensionally transforms a pointset includes a receive matrix component that receives a high dimensional point set, an R matrix generator that receives an input matrix from the receive matrix component and generates a projection matrix based thereon. In particular, the R matrix generator utilizes the dimensions of the input matrix to produce the projection matrix, not the data itself. The projection matrix entries of at least one of +1, 0, −1. The system also includes a transformation engine that reduces the dimensionality of the pointset via employment of the projection matrix while maintaining integrity of a pairwise distance property.

According to a further aspect of the present invention, a transformation engine simplifies matrix multiplication to effect reduced dimensional transformation. The transformation engine produces a transformed matrix and further includes a partition component that, for respective entries in the transformed matrix, discards calculations wherein attributes are to be multiplied by zero, forms a first set of attributes that are to be multiplied by +1, and forms a second set of attributes that are to be multiplied by −1. The transformation engine also includes a first set summer that produces a first sum from the first set of attributes for entries in the transformed matrix, a second set summer that produces a second sum from the first set of attributes for respective entries in the transformed matrix, and a difference component that subtracts the first and second sums to produce the respective entries for the transformed matrix According to still another aspect of the present invention, a method for transforming n points in d dimensionality, represented as an n×d input matrix, to k dimensionality is disclosed, where k is less than d. An n×k transformed matrix is produced thereby while variations in a distance property between pairs of the points are mitigated. The method includes multiplying the n×d input matrix by a d×k projection matrix having entries randomly populated from the group comprising +1, 0, −1. Then, for respective entries in the transformed matrix, calculations wherein multiplication would be by 0 are discarded, a first sum is produced wherein multiplication would be by +1 and a second sum is produced wherein multiplication would be by −1. Finally, respective first and second sums are subtracted to obtain each entry in the transformed matrix.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 2 illustrates a formula for matrix multiplications that effect dimensional transformations.

FIG. 3 illustrates computations carried out in matrix multiplications.

FIG. 4 illustrates computations for effecting dimensional transforms utilizing a projection matrix having entries of +1, 0, −1.

FIG. 5 illustrates computations for effecting dimensional transforms utilizing a projection matrix having entries of +1, −1.

FIG. 6 illustrates computations for effecting dimensional transforms utilizing a projection matrix having entries of +1, 0, −1 where +1's are on top and −1's are on bottom of the projection matrix.

Figure 1:
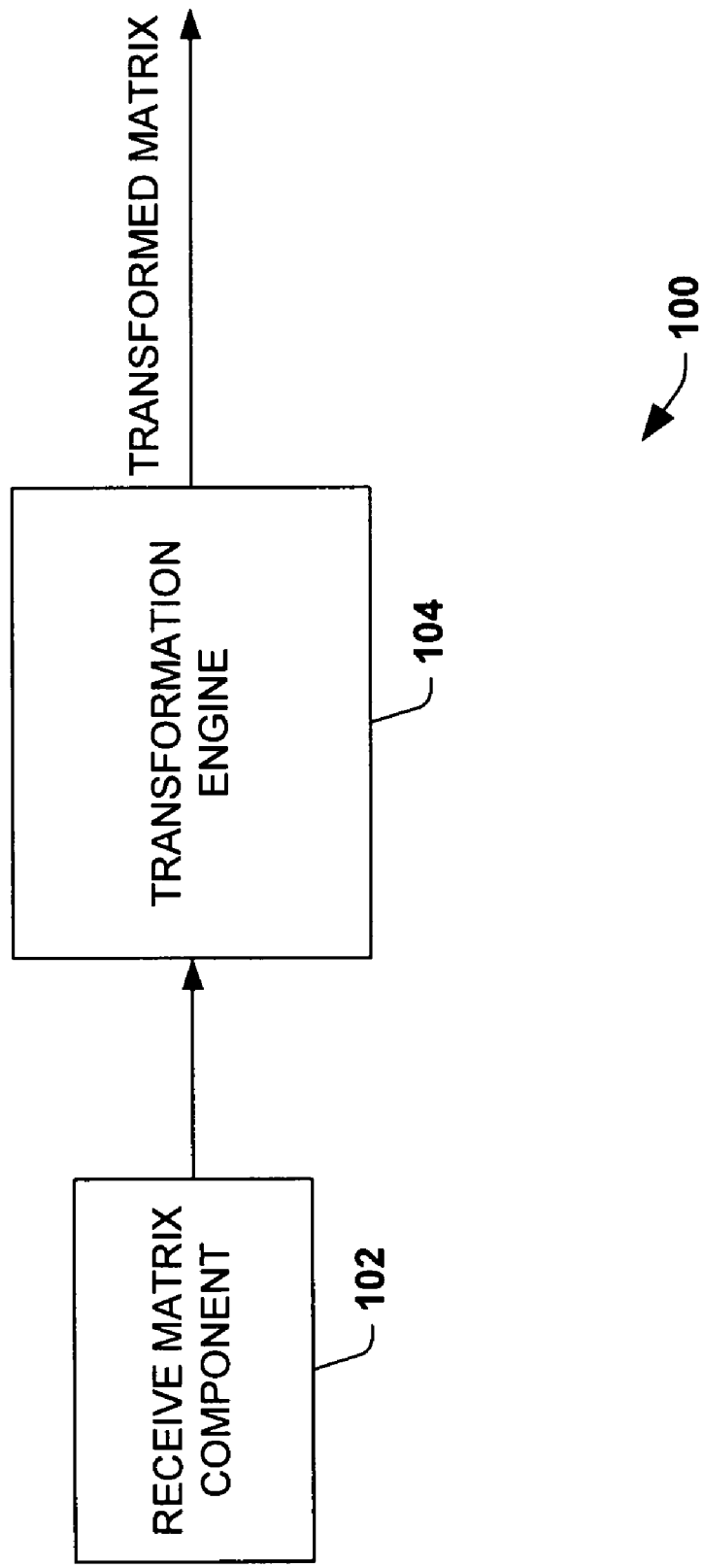
FIG. 1 is a block diagram of a system that facilitates dimensional transforms.

Appendix A illustrates a proof establishing that a pairwise distance is maintained during transformations in accordance with the present invention, and this Appendix is to be considered part of this specification.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

It is to be appreciated that, for purposes of the present invention, any or all of the functionality associated with modules, systems and/or components discussed herein can be achieved in any of a variety of ways (e.g. combination or individual implementations of active server pages (ASPs), common gateway interfaces (CGIs), application programming interfaces (API's), structured query language (SQL), component object model (COM), distributed COM (DCOM), system object model (SOM), distributed SOM (DSOM), ActiveX, common object request broker architecture (CORBA), database management systems (DBMSs), relational database management systems (RDBMSs), object-oriented database management system (ODBMSs), object-relational database management systems (ORDBMS), remote method invocation (RMI), C, C++, practical extraction and reporting language (PERL), applets, HTML, dynamic HTML, server side includes (SSIs), extensible markup language (XML), portable document format (PDF), wireless markup language (WML), standard generalized markup language (SGML), handheld device markup language (HDML), graphics interchange format (GIF), joint photographic experts group (JPEG), binary large object (BLOB), other script or executable components).

FIG. 1 is a schematic block diagram of a system 100 that transforms a dimensionality of a set of data points. The system 100 includes a receive matrix component 102 and a transformation engine 104. The system 100 transforms an input matrix A to a transformed matrix T where the transformed matrix is of lower dimension than the input matrix. A projection matrix is developed and implemented in performing the transformation.

The receive matrix component 102 sends or transfers an input matrix to the transformation engine 104. The receive matrix component 102 can generate the input matrix from high dimensional data. Additionally, the receive matrix component 102 can receive the input matrix from a data store (not shown) storing high dimensional data. The input matrix is an n×d matrix representative of n points in d dimensional Euclidean space ($\mathbb{R}^d$), where n can be a large number of data points, such as a million data points, and d can be a high dimensional space, such as a space having around ten thousand dimensions. Each row of the input matrix n represents a vector of d attributes. The transformed matrix T is an n×k matrix representative of the n points embedded into k dimensional Euclidean space ($\mathbb{R}^k$), where k<d. Likewise, respective rows of the transformed matrix n, represent a vector of k attributes. The n points are transformed into the lower dimensional space while mitigating variations in the distance between pairs of data points. It is to be appreciated that any desired accuracy can be achieved with a corresponding increase in k. For instance, if this pairwise distance property is maintained within 0.05% of its original value for all point pairs at particular k, it may be maintained within 0.01% of its original value for all point pairs by increasing k.

The transformation engine 104 dimensionally transforms the input matrix A into the transformed matrix T while maintaining the pairwise distance within an acceptable degree of error. The pairwise distance is preserved according to the guarantee defined by Eq. 1, shown below, such that Eq. 1 is met for a given acceptable degree of error $\epsilon$. The acceptable degree of error $\epsilon$ is selectable and can vary.

Let f be a function that transforms (maps) points from d dimensional Euclidean space ($\mathbb{R}^d$) into k dimensional Euclidean space ($\mathbb{R}^k$). That is, provided a point u in d-dimensional Euclidean space, f(u) denotes its k-dimensional counterpart as prescribed by f. Similarly, for a point v in d-dimensional Euclidean space, f(v) denotes its k-dimensional counterpart as prescribed by f. To express mathematically that f is a transformation that indeed preserves pairwise distances for the acceptable degree of error $\epsilon$, the following formula is used:

Given $\epsilon>0$ (where the parameter $\epsilon$ controls accuracy in terms of pairwise distance preservation) and an integer n, let k be a positive integer such that $k \geq k_0 = 10(\epsilon^{-2} \log n)$. For a set P of n points in $\mathbb{R}^d$ there exists f: $\mathbb{R}^d \to \mathbb{R}^k$ such that for all $u, v \in P$ $$(1-\epsilon)||u-v||^2 \leq ||f(u)-f(v)||^2 \leq (1+\epsilon)||u-v||^2 \qquad \text{Eq. 1}$$

To effect the transformed matrix, the transformation engine 104 generates a projection matrix R. The projection matrix is generated with d×k dimensions so that the multiplication of the n×d input matrix A and the d×k projection matrix R produces the n×k transformed matrix T. It is to be appreciated that the transformation engine 104 only looks to the dimensions (e.g., n points and d attributes) of the input matrix A to produce the projection matrix R, and not to the contents of the input matrix. According to one or more aspects of the present invention, the entries in the projection matrix can be binary or ternary values, such as (−1, +1) or (−1, 0, +1). In accordance with one or more aspects of the present invention, the entries are randomly assigned to the projection matrix according to a probability distribution. Two such possible probability distributions are shown below in association with Eqs. 2 and 3:

For integer $k \geq k_0$, let R be a d×k projection matrix with $R(i,j)=r_{ij}$, where $\{r_{ij}\}$ are independent random variables from either one of the following two probability distributions:

$$r_{ij} = \begin{cases} +1 & \text{with probability } 1/2 \\ -1 & \text{with probability } 1/2 \end{cases} \quad \text{Eq. 2}$$

$$r_{ij} = \sqrt{3} \times \begin{cases} +1 & 1/6 \\ 0 & \text{with probability } 2/3 \\ -1 & 1/6 \end{cases} \quad \text{Eq. 3}$$

where R is the projection matrix and $k_o$ is defined by Eq. 4 below.

Let P be an arbitrary set of n points in $\mathbb{R}^d$, represented as an n×d matrix A. Since the projection matrix R is a probabilistic construction, β is used to control the probability of success. Given $\epsilon, \beta > 0$ let $$k_0 = \frac{4 + 2\beta}{\epsilon^2/2 - \epsilon^3/3} \log n \quad \text{Eq. 4}$$

Thus, k should be at least equal to $k_0$ in order to meet the guarantee of Eq. 1. Additionally, Eq. 4 can be used to find the minimum k that yields an acceptable transformation of the input matrix to the transformed matrix. The β is also selectable and can vary according to aspects of the invention. The ε used in Eq. 4 is the same value as used in Eq. 1. It is appreciated that entries of projection matrix can be multiplied by a scaler, such as is illustrated in Eq. 3 (where entries are multiplied by a scaler of √3). However, this scaling is generally not required because, typically, only relative distances are desired, not absolute distances. Additionally, the entries in the projection matrix R (−1, +1) or (+1, 0, −1) simplify the matrix computations needed to perform the projection of the points from the d-dimensional Euclidean space to the k-dimensional Euclidean space.

The transformation engine, after generating the projection matrix, multiplies the input matrix by the projection matrix to generate the transformed matrix. Thus, the set of data points represented in d dimensional Euclidean space are mapped or transformed to a set of data points represented in k dimensional Euclidean space. This transformed set of data points can then be utilized more efficiently by other applications.

As support for the present invention, a mathematical proof is provided at Appendix A (Dimitris Achlioptas, *Database-friendly Random Projections*, ACM Symposium 2001 on Principles of Database Systems, pp. 274-281), which is considered part of this specification. The proof establishes that results of a dimensional transformation according to Eqs. 2-4 preserve pairwise distance information in accordance with the guarantee of Eq. 1.

FIG. 2 illustrates a matrix multiplication equation utilized to perform dimensional transforms. An n×d input matrix ($A_d$) 201 representative of n points in d dimensional space is multiplied by a randomly generated d×k matrix ($R_k$) 202 to generate an n×k transformed matrix ($T_k$) 203 representative of the n points in k dimensional space. The input matrix represents respective data points as a row vector of d attributes. Similarly, the transformed matrix represents data points as a row vector of k attributes. Entries in the projection matrix are embedded according to one of two probability distributions: +1, 0, and −1 with probabilities of 1/6, 2/3, and 1/6, respectively, or +1 and −1, each with probabilities of 1/2. Other aspects of the invention can utilize other suitable probability distributions, so long as they maintain the pairwise distance property (e.g., meet the guarantee of Eq. 1).

FIG. 3 illustrates a matrix multiplication process to generate entries within a resulting matrix (e.g., the transformed matrix 303). In particular, respective entries in each row of input matrix 301 are multiplied by respective entries in columns of projection matrix 302. The entries in the input matrix, $a_{nd}$, are also referred to as attributes. The entries in the projection matrix 302, $r_{dk}$, are of binary or ternary values such as (−1, +1) and (−1, 0, +1) for example, and are randomly embedded into the projection matrix 302 according to a probability distribution as discussed supra. Respective row and column products are then summed 304 to generate entries, $t_{nk}$, of the transformed matrix 303. The products can be summed because the entries $r_{dk}$ are −1, 0, or +1. It is appreciated that dimensional transformations carried out in this fashion may involve many calculations, such as, for example, where around a million data points in ten thousand dimensional space are transformed into a dimensional space on the order of a couple of hundred.

The exemplary matrices discussed below with respect to FIGS. 4-6 are simply for illustrative purposes only to facilitate explanation of the transformation operation in accordance with the present invention. The matrices are thus selected to illustrate the transformation operation and the present invention is not limited to the values and dimensions of the exemplary matrices. The values are shown as integers for illustrative purposes only. However the invention can include values as positive or negative real numbers. Furthermore, it is to be appreciated that due to the small sizes of these example matrices the guarantee of Eq. 1 may not necessarily be followed. However, the examples are provided so as to more clearly describe and facilitate understanding the matrix operations in connection with the present invention as would be applied to very large data point sets in high dimensions (e.g., around one million data points each having >10,000 attributes).

FIG. 4 is an example of matrix multiplication according to one aspect of the invention. More particularly, a 3×6 input matrix 401 is multiplied by a 6×3 projection matrix 402 to generate a 3×3 transformed matrix 403. The input matrix 401 is shown for 3 data points where each data point has 6 attributes. The transformed matrix 403 also has the 3 data points but is reduced to 3 attributes. Entries within the projection matrix include +1, 0, −1 generated with probabilities of 1/6, 2/3, and 1/6, respectively. As such, two thirds of the product calculations yield a result of 0, 1/6 of the calculations yield a positive number equal to the corresponding entry in the input matrix and the remaining 1/6 of the calculation yield a negative number equal to the corresponding entry in the input matrix. Consequently, arriving at the transformed matrix can be simplified by disregarding the two thirds of calculations or attributes wherein a 0 is involved. Additionally, for entries in the transformed matrix, entries within the input matrix that are to be multiplied by +1 can be added to obtain a first sum, and entries within the input matrix that are multiplied by −1 can be added to obtain a second sum as shown by the intermediary computation at 404. Then, these sums are subtracted to obtain respective entries in the transformed matrix 403. In accordance with the present invention, this can be accomplished while maintaining an acceptable guarantee (e.g., 5%, 10%, 12%) of pairwise distances between data points.

FIG. 5 illustrates another exemplary matrix multiplication according to an aspect of the invention wherein the entries within a 6×3 projection matrix 502 include +1, −1, each being generated with an equal probability of 1/2. The projection matrix 502 is multiplied by a 3×6 input matrix 501 to generate a 3×3 transformed matrix 503. The input matrix 501 is shown for 3 data points where each data point has 6 attributes. The transformed matrix 503 illustrates the 3 data points in 3 dimensions (e.g., reduced to having 3 attributes). Since the entry within the input matrix 501 is multiplied by a +1 or −1, to obtain the entries within the resulting transformed matrix, respective entries within the input matrix that will be multiplied by +1 can be put into one group and summed, and respective entries within the input matrix that will be multiplied by −1 can be placed into a second group and summed. Then, these sums can be differenced to obtain the respective entries within the transformed matrix. This can be done to dimensionally transform the data set, while maintaining pairwise distances and/or meeting the guarantee of Eq. 1.

FIG. 6 illustrates another exemplary matrix multiplication according to an aspect of the invention. The entries within a projection matrix 602 are either +1 or −1, and the +1's happen to be on top and the −1's happen to be on bottom of the 6×3 projection matrix 602. The input matrix 601 is shown for 3 data points where each data point has 6 attributes. The transformed matrix 603 shows the 3 data points in 3 dimensions (e.g., reduced to having 3 attributes). It can be seen that for each entry in the transformed matrix 603, the first three corresponding entries of respective rows in the 3×6 input matrix 601 are subtracted from the last three corresponding entries of the respective rows in the 3×6 input matrix 601. As such, when half of the entries in the projection matrix 602 are +1 and the other half are −1, and the entries are distributed on the top and bottom of the matrix, then the total number of columns in the input matrix can be split in half. To obtain entries for the transformed matrix 603, the respective first half of the entries of the input matrix 601 can be added to obtain a first sum, and the respective second half of the entries of the input matrix 601 can be added to obtain a second sum. These sums can then be differenced to provide the corresponding entry for the transformed matrix 603. Also, in this situation, only one column of the transformed matrix typically needs to be generated, as respective columns in the transformed matrix 603 will generally be identical.

Figure 7:
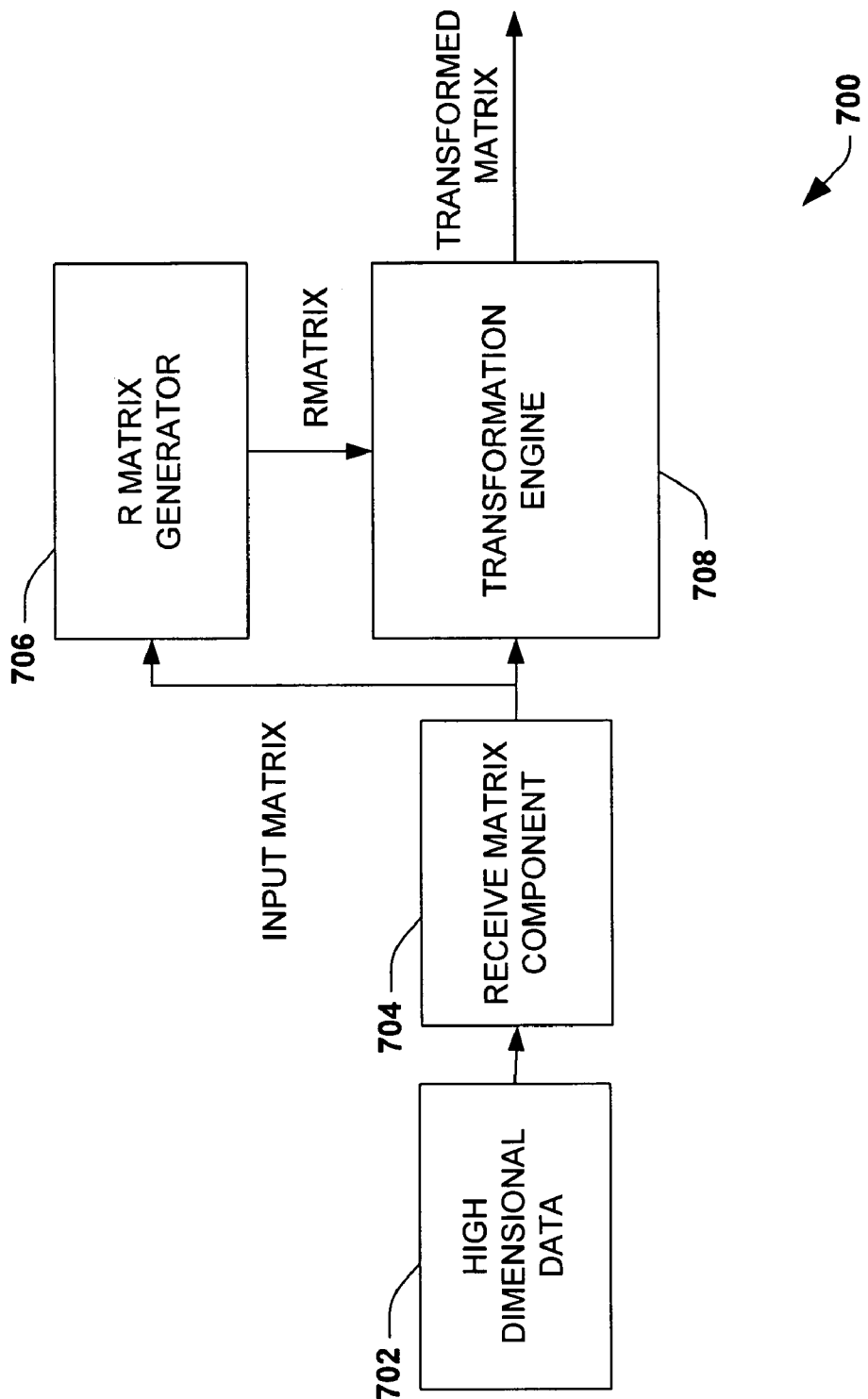
FIG. 7 is a schematic block diagram illustrating a system that performs dimensional transforms.

FIG. 7 is a schematic block diagram of a system 700 that transforms the dimensionality of a data pointset. High dimensional data 702 is received by a receive matrix component 704. The receive matrix component 704 may receive the high dimensional data 702 represented as a matrix, where rows of the matrix correspond to the points in the data set and columns of the matrix correspond to attributes of the points in the set. Thus, respective rows of the input matrix are represented as a vector of attributes. The attributes of the data can identify the location of the points in high dimensional space and, as such, also define the dimensionality of the data point set. By way of example, the number of points may be quite large (e.g., on the order of one million) and the number of attributes (e.g., dimensionality) may be around ten thousand.

The receive matrix component 704 outputs an input matrix containing the high dimensional data 702 that is to be transformed. The input matrix is forwarded to an R matrix generator component 706 and a transformation engine 708. The R matrix generator component 706 looks to the input matrix to generate a projection matrix. In particular, the R matrix component determines the number of rows to include in the projection matrix based upon the number of columns (attributes) in the input matrix. The R matrix generator component 706 generates the projection matrix with a number of columns equal to the dimensionality to which the input matrix is being transformed. The number of columns are, however, also controlled to provide a sufficient guarantee per Eq. 1 and an acceptable error range. The R matrix generator component 706 randomly populates entries in the projection matrix according to one of two probability distributions: +1, 0, −1 with probabilities of 1/6, 2/3, and 1/6, respectively, or +1, −1, each with probabilities of 1/2. Other aspects of the invention can utilize other suitable probability distributions.

The transformation engine 708 receives the projection matrix and produces a transformed matrix which is the data point set transformed into a lower dimensional space, with a preserved pairwise distance property. Given the probability distributions of the entries within the projection matrix, the transformation engine calculates entries within the transformed matrix in manners described above with reference to FIGS. 2-6 (e.g., omitting two thirds of the calculations, obtaining two sums and taking their difference, splitting the input matrix). As such, the transformation engine 708 does not have to perform many lengthy and complex computations to produce the transformed matrix—this mitigates inefficiencies associated with producing such transformations in conventional manners. Thus, the entries in the projection matrix, (−1, +1) or (+1, 0, −1), simplify the matrix computations needed to perform the projection of the points from the d-dimensional Euclidean space to the k-dimensional Euclidean space.

Figure 8:
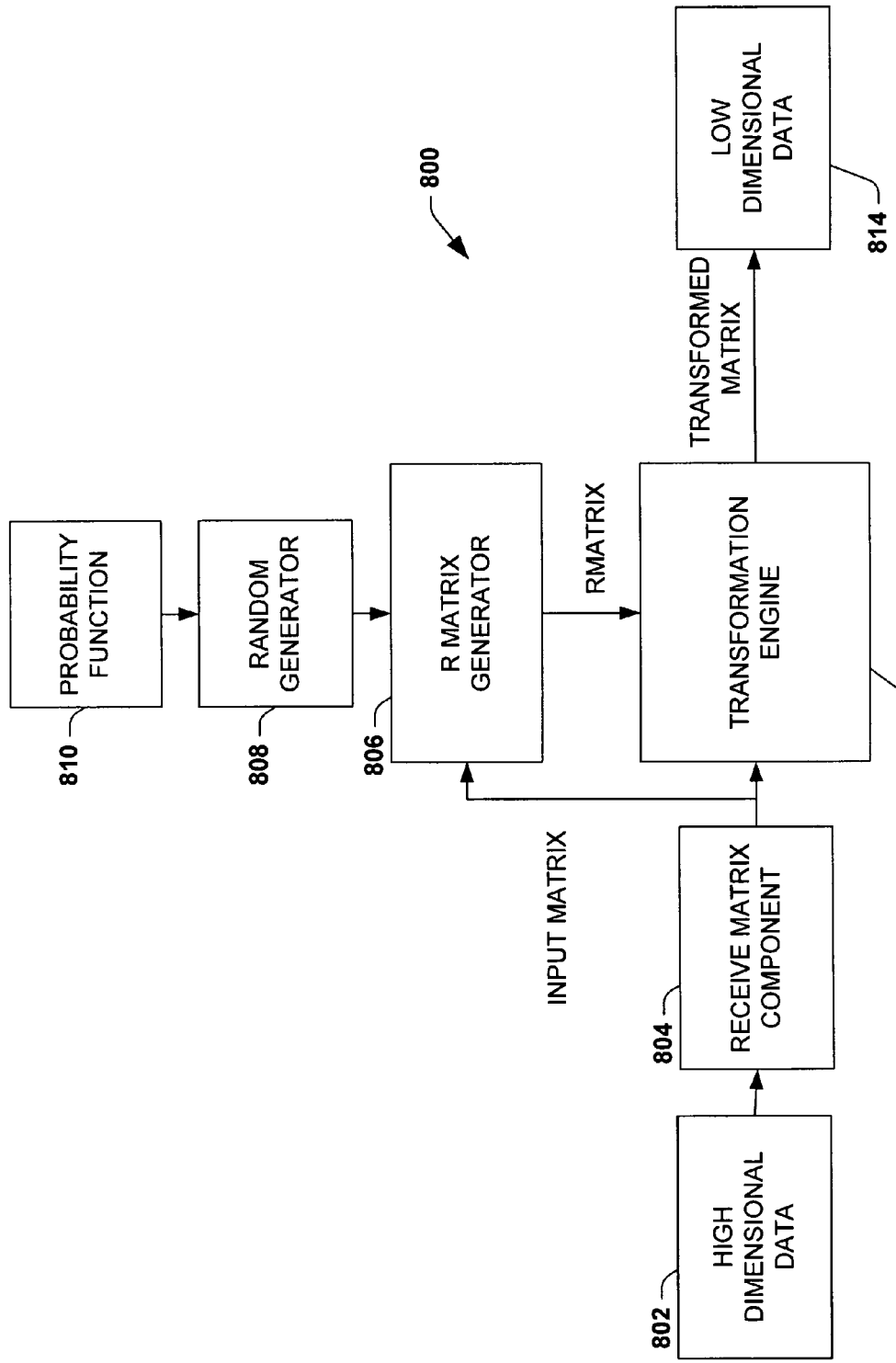
FIG. 8 is another schematic block diagram illustrating a system that performs dimensional transforms and includes a probability distribution and a random generator.

FIG. 8 is a schematic block diagram of a system 800 that transforms the dimensionality of a data pointset. Like components in FIG. 8 perform like functions to that described above with respect to FIG. 7 and, as such, are not discussed herein further for purposes of brevity. In the system 800, a probability distribution 810 feeds into a random generator 808, which, in turn, provides input into an R matrix generator 806. The probability distribution is adapted to provide the random generator with a probability that randomly generated numbers are to appear. According to one or more aspects of the present invention, probabilities of 1/6, 2/3, and 1/6 are provided for entries +1, 0, −1, respectively, and equal probabilities of 1/2 are provided for +1, −1, respectively.

The random generator supplies random numbers to the R matrix generator for use as entries in a projection matrix. According to one or more aspects of the present invention, the random generator produces binary values according to the forgoing probabilities.

Figure 9:
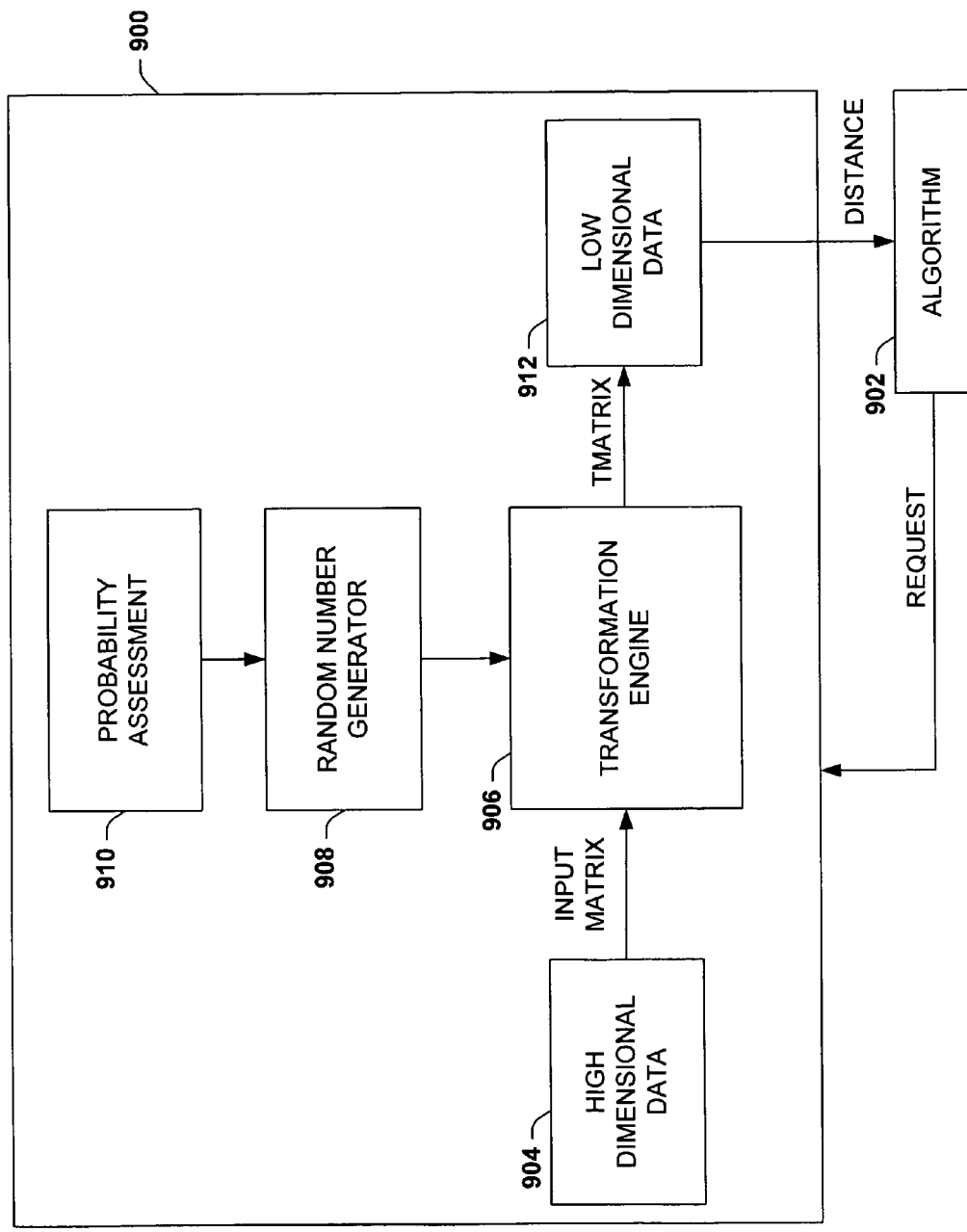
FIG. 9 is another schematic block diagram illustrating a system that performs dimensional transforms and outputs transformed lower dimensional data having a preserved pairwise distance property to requesting algorithms.

FIG. 9 is a block diagram of system adapted to transform the dimensionality of a pointset from a high dimension to a lower dimension. The system performs the transform, while maintaining a distance property between pairs of points within an acceptable guarantee (e.g., around 5%). The smaller, lower dimensional representation of the pointset and the preserved distance property can be output to an algorithm 902 in response to a request submitted to the system. By providing a low dimensional representation of data, such embeddings speed up algorithms, and in particular algorithms whose run-time depends exponentially on the dimension of the working space. The following are examples of only a few algorithms that may benefit from utilizing transformed data: an $\epsilon$-approximate nearest neighbor problem, where (after some preprocessing of a pointset P) an answer is given to queries such as, given an arbitrary point x, find a point $y \in P$, such that for every point $z \in P ||x-z|| \geq (1-\epsilon)||x-y||$; an approximation algorithm for a version of clustering where it is sought to minimize sum of squares of intra cluster distances; and data-stream" computations, where there is limited memory and only a single pass over the data (stream) is allowed.

Like components in FIG. 9 perform like functions to that described with respect to similar components in FIGS. 7 and 8. Accordingly, discussion of these components is omitted for sake of brevity. A probability assessment component 910 assigns probabilities to numbers that are generated by a random number generator 908. In accordance with one aspect of the present invention, the probability assessment component assigns probabilities of 1/6, 2/3, and 1/6, respectively, to numbers +1, 0, −1 generated by the random number generator. According to another aspect of the present invention, the probability assessment component is also adapted to assign equal probabilities of 1/2 to each of the numbers +1 and −1 generated by the random number generator. The numbers generated by the random number generator 908 are provided to a transformation engine 906 which utilizes them as entries in a projection matrix in executing the dimensional transform.

Figure 10:
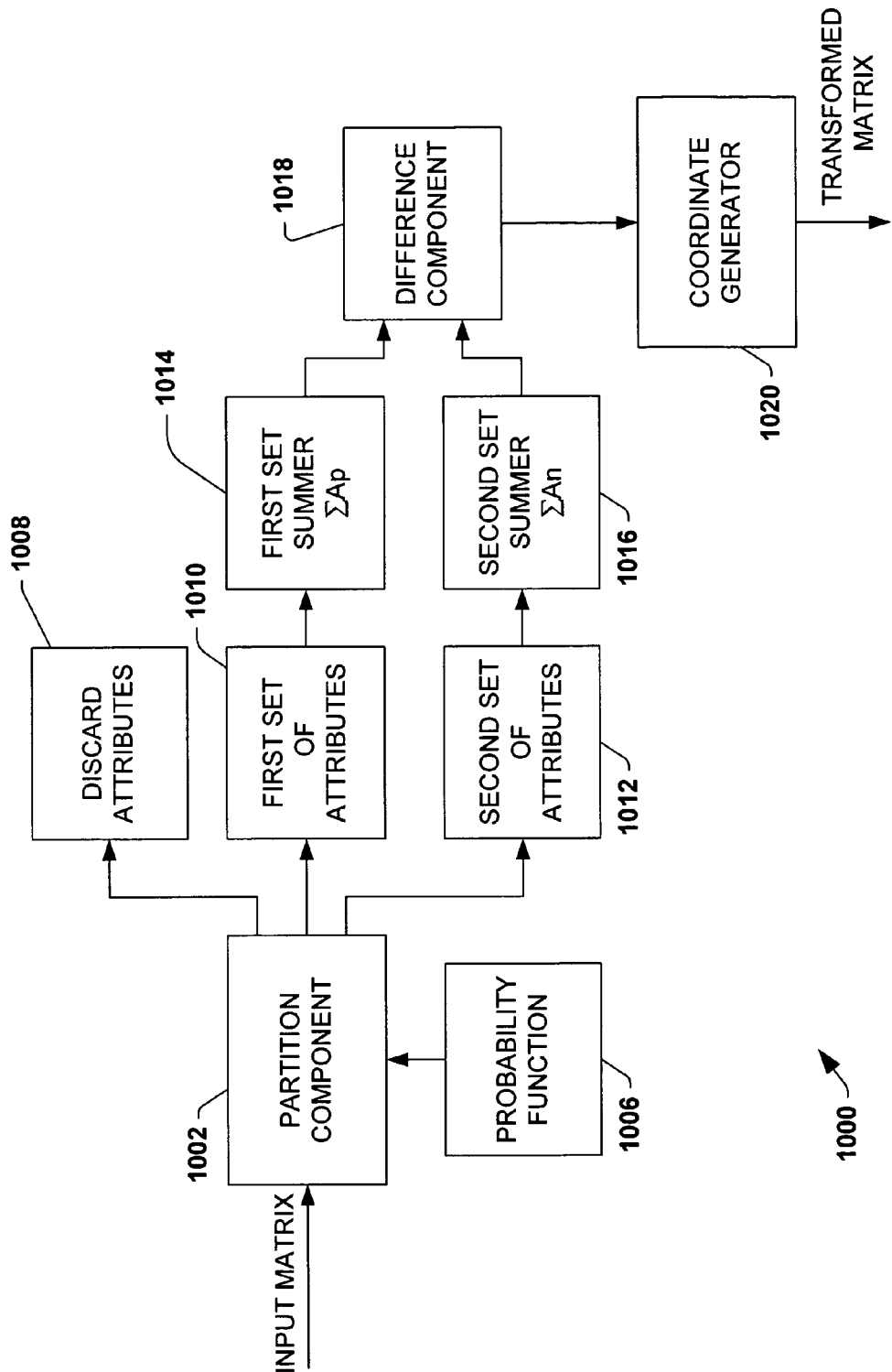
FIG. 10 is a schematic block diagram for effecting a dimensional transform in a simplified fashion in accordance with one or more aspects of the present invention.

FIG. 10 is a block diagram of a transformation system according to one aspect of the invention. The system 1000 transforms data points from a higher dimension, represented as an input matrix to a lower dimension, represented as a transformed matrix. The system 1000 generates k coordinates for each row or respective rows in the transformed matrix.

A partition component 1002 receives an input matrix. The input matrix represents n data points by n rows or vectors of the input matrix. Each of the n rows contains d attributes or coordinates. The partition component processes each row separately, k times. For a given row of the input matrix, the partition component 1002 partitions the attributes of that row. An amount of the attributes are randomly discarded, such as 2/3 and referred to as discarded attributes 1008. It is appreciated that the amount of the attributes discarded can vary, so long as the guarantee of Eq. 1 still holds true with respect to a selected error range. The remaining attributes are randomly partitioned into a first set of attributes 1010 and a second set of attributes 1012, generally evenly. A first set summer 1014 sums together the attributes of the first set 1010 to obtain a first set sum. A second set summer 1016 sums together the attributes of the second set 1012 to obtain a second set sum. A difference component 1018 subtracts the sum of the second set from the sum of the first set to generate a coordinate $c_{ij}$ of the transformed matrix where i is an integer from 1 to k and j is an integer from 1 to n corresponding to a current the row of the input matrix and the transformed matrix. A coordinate generator 1020 receives coordinates from the difference component 1018. The coordinate generator 1020 generates a transformed matrix after all of the coordinates have been generated for the input matrix. The transformed matrix represents n data points by n rows or vectors of the input matrix. Each of the n rows contains k attributes or coordinates, where k is less than d.

The partition component 1002 determines partitioning based on a probability function or distribution 1006. The probability distribution 1006 determines probabilities for discarding attributes and partitioning attributes into the first and second sets of attributes 1010 and 1012. One probability distribution that can be used is to discard 2/3 of the attributes, partition 1/6 into the first set of attributes 1010 and partition 1/6 into the second set of attributes 1012. Another probability distribution that can be used is to partition 1/2 of the attributes into the first set of attributes 1010 and 1/2 of the attributes into the second set of attributes 1012. Other probability distributions can be used with the invention.

Figure 11:
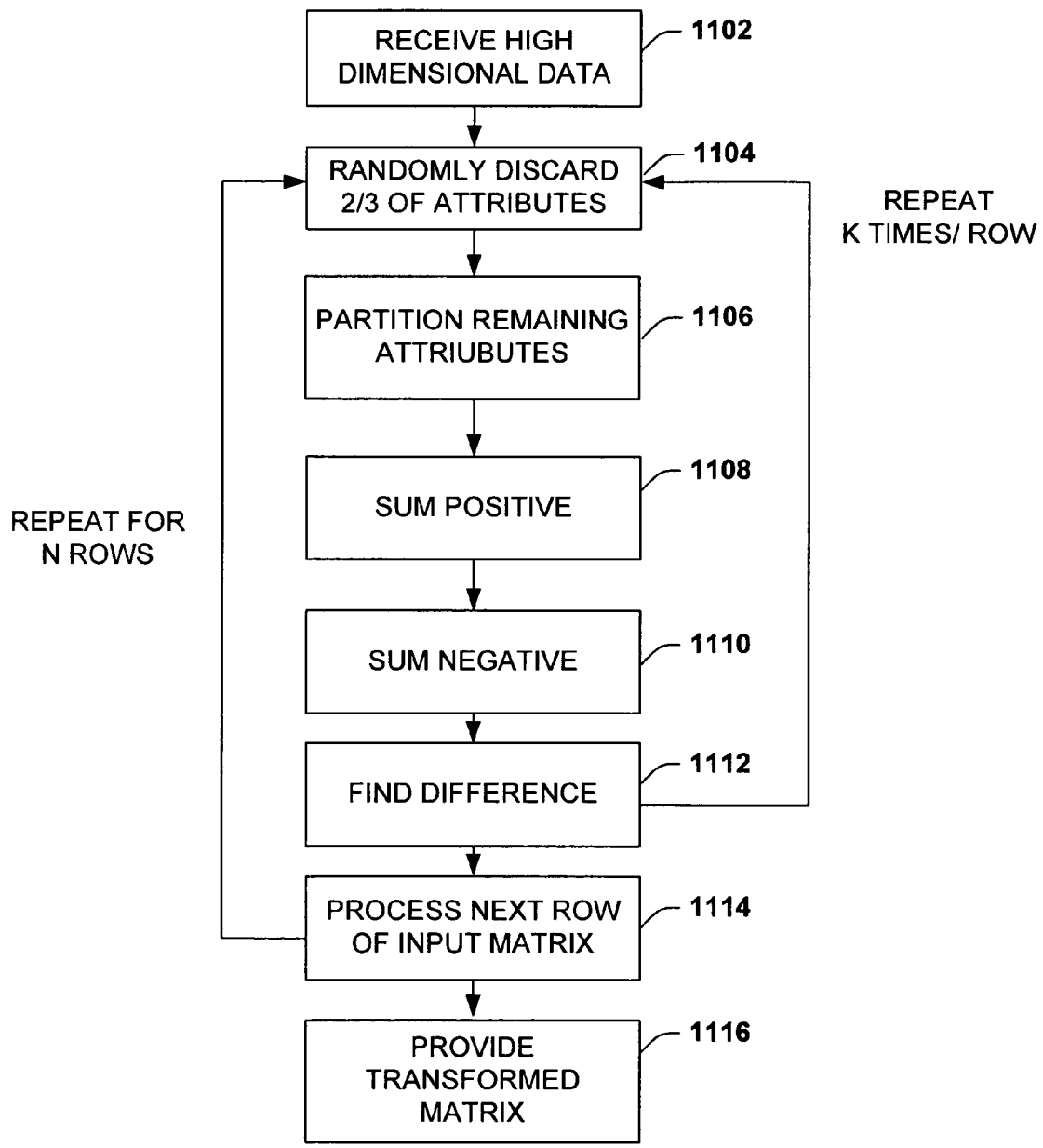
FIG. 11 illustrates a methodology for performing a dimensional transform in accordance with one or more aspects of the present invention.
Figure 12:
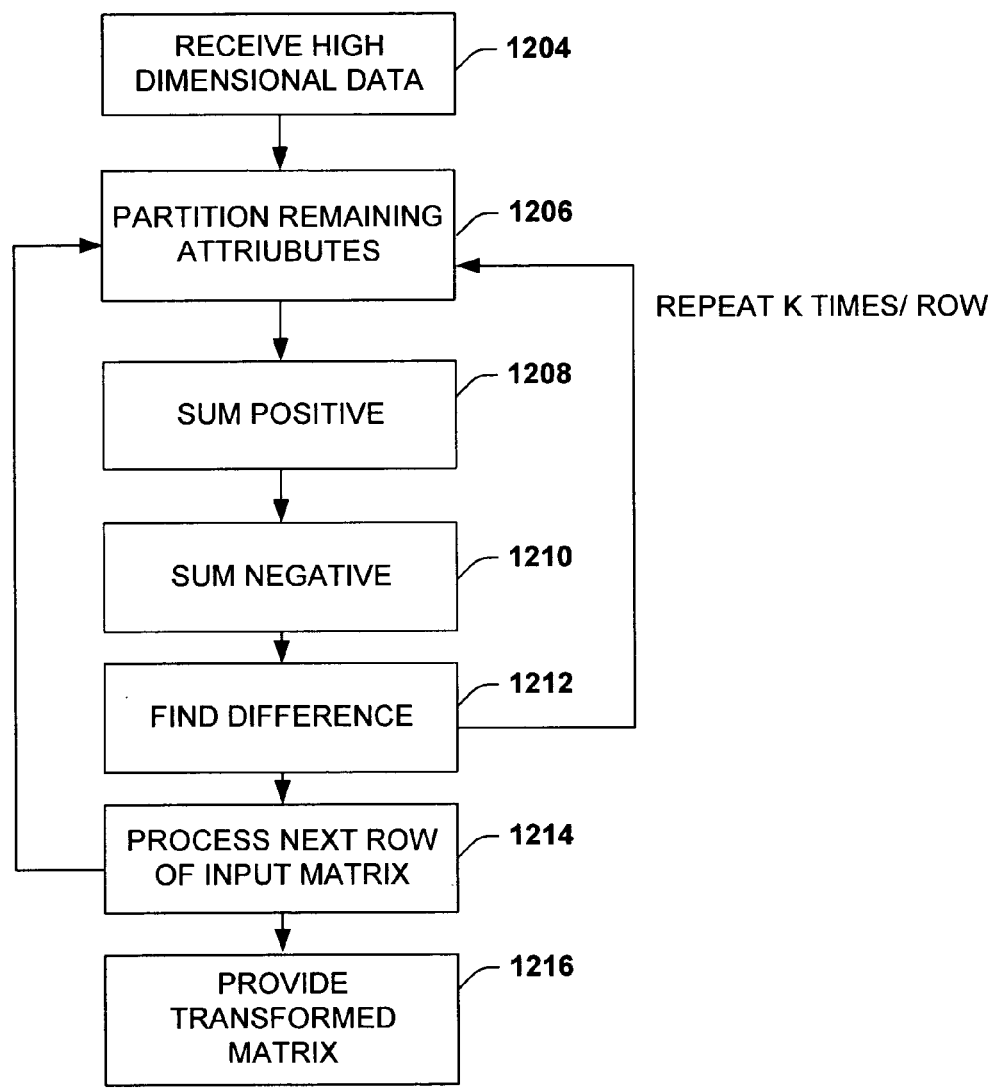
FIG. 12 illustrates another methodology for performing a dimensional transform in accordance with one or more aspects of the present invention.

In view of the exemplary systems shown and described above, a methodology that may be implemented in accordance with the present invention will be better appreciated with reference to the flow charts of FIGS. 11 and 12. While, for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIG. 11, a methodology for projecting a matrix in accordance with one or more aspects of the present invention is illustrated. The method projects an input matrix of d dimensions to a transformed matrix of k dimensions. An input matrix is provided at 1102. The input matrix represents n data points by n rows of the input matrix. The n rows, respectively contain d attributes. For respective rows of the transformed matrix, perform the following:

Randomly discard 2/3 of the attributes from a row of the input matrix at 1104. Alternate aspects of the invention can randomly discard other amounts of the attributes, such as, none, 1/4, 1/2 and the like. The remaining attributes from the row are referred to as end points. The remaining attributes are partitioned into a first set of attributes and a second set of attributes at 1106. Usually, the attributes are partitioned evenly such that the number of attributes in the first set of attributes is equal to the number of attributes in the second set of attributes. The first set of attributes is summed to a positive attribute at 1108. The second set of attributes is summed to a negative attribute at 1110. The negative attribute (sum of the second set of attributes) is subtracted from the positive attribute (sum of the first set of attributes) at 1112. This difference is a coordinate of the transformed matrix. The method is repeated k times for each row of the input matrix. Then, a next row of the input matrix is processed according to 1104, 1106, 1108, 1110 and 1112 at 1114. After the rows have been processed, a transformed matrix is provided at 1116. The transformed matrix has n data points where each row contains k attributes.

FIG. 12 is a flow diagram of a method projecting a matrix according to one aspect of the invention. The method is similar to that of FIG. 11, except that attributes are not discarded. The method projects an input matrix of d dimensions to a transformed matrix of k dimensions. An input matrix is received at 1204. The input matrix represents n data points by n rows of the input matrix. Each of the n rows contains d attributes. For the rows of the transformed matrix, perform the following: The attributes are partitioned into a first set of attributes and a second set of attributes at 1206. Usually, the attributes are partitioned evenly such that the number of attributes in the first set of attributes is equal to the number of attributes in the second set of attributes. The first set of attributes is summed to a positive attribute at 1208. The second set of attributes is summed to a negative attribute at 1210. The negative attribute (sum of the second set of attributes) is subtracted from the positive attribute (sum of the first set of attributes) at 1212. This difference is a coordinate of the transformed matrix. The method is repeated k times for each row of the input matrix. Then, a next row of the input matrix is processed according to 1206, 1208, 1210 and 1212 at 1214. After the rows have been processed, a transformed matrix is provided at 1216. The transformed matrix has n data points where each row contains k attributes.

Figure 13:
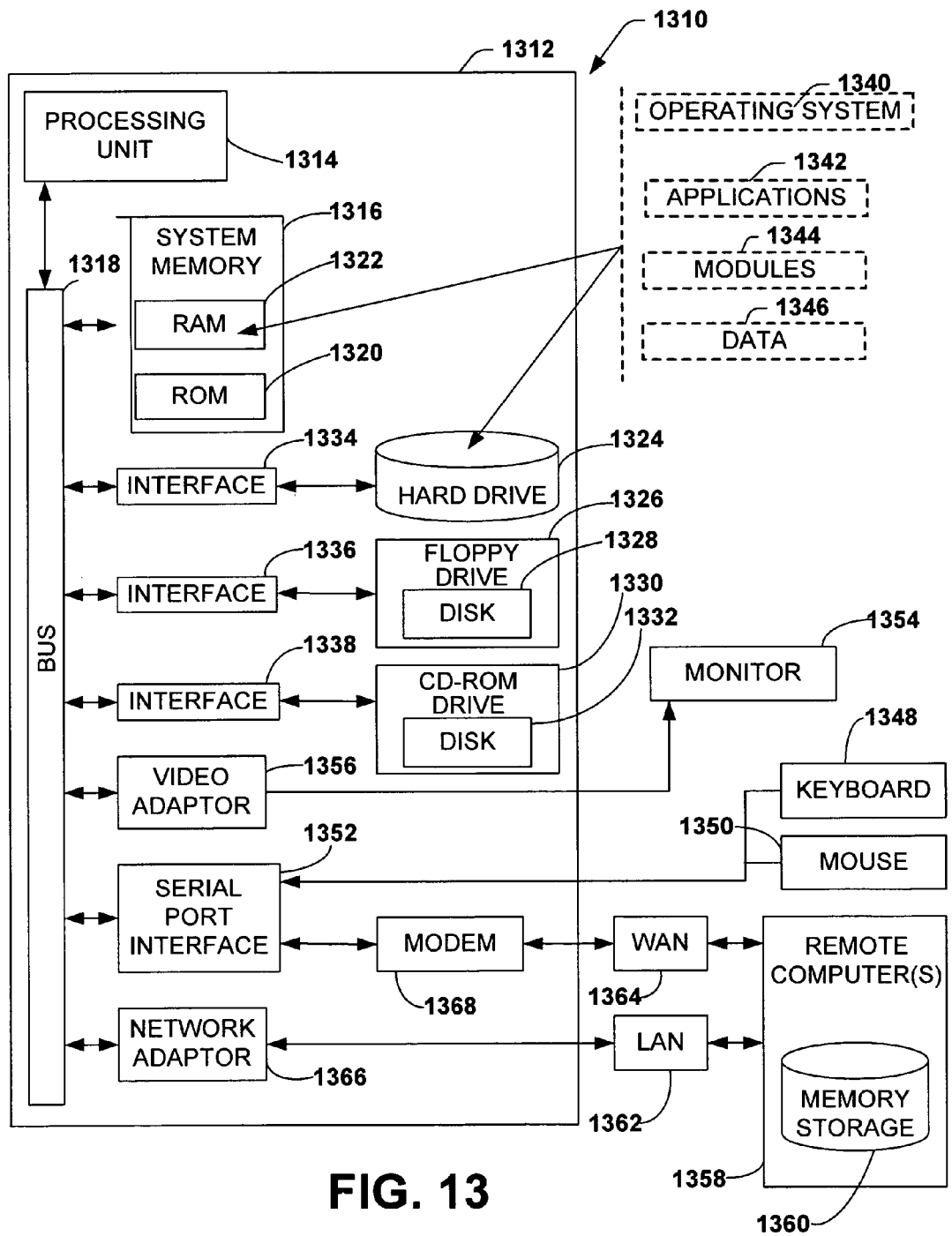
FIG. 13 is a schematic block diagram of an exemplary operating environment for a system configured in accordance with the present invention.

In order to provide additional context for various aspects of the present invention, FIG. 13 and the following discussion are intended to provide a brief, general description of one possible suitable computing environment 1410 in which the various aspects of the present invention may be implemented. It is to be appreciated that the computing environment 1410 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 13 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 13, an exemplary environment 1310 for implementing various aspects of the invention includes a computer 1312, including a processing unit 1314, a system memory 1316, and a system bus 1318 that couples various system components including the system memory to the processing unit 1314. The processing unit 1314 may be any of various commercially available processors. Dual microprocessors and other multi-processor architectures also can be used as the processing unit 1314.

The system bus 1318 may be any of several types of bus structure including a memory bus or memory controller, a peripheral bus, and a local bus using any of a variety of commercially available bus architectures. The computer memory 1316 includes read only memory (ROM) 1320 and random access memory (RAM) 1322. A basic input/output system (BIOS), containing the basic routines that help to transfer information between elements within the computer 1312, such as during start-up, is stored in ROM 1320.

The computer 1312 may further include a hard disk drive 1324, a magnetic disk drive 1326, e.g., to read from or write to a removable disk 1328, and an optical disk drive 1330, e.g., for reading a CD-ROM disk 1332 or to read from or write to other optical media. The hard disk drive 1324, magnetic disk drive 1326, and optical disk drive 1330 are connected to the system bus 1318 by a hard disk drive interface 1334, a magnetic disk drive interface 1336, and an optical drive interface 1338, respectively. The computer 1312 typically includes at least some form of computer readable media. Computer readable media can be any available media that can be accessed by the computer 1312. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1312. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1322, including an operating system 1340, one or more application programs 1342, other program modules 1344, and program non-interrupt data 1346. The operating system 1340 in the computer 1312 can be any of a number of commercially available operating systems.

A user may enter commands and information into the computer 1312 through a keyboard 1348 and a pointing device, such as a mouse 1350. Other input devices (not shown) may include a microphone, an IR remote control, a joystick, a game pad, a satellite dish, a scanner, or the like. These and other input devices are often connected to the processing unit 1314 through a serial port interface 1352 that is coupled to the system bus 1318, but may be connected by other interfaces, such as a parallel port, a game port, a universal serial bus ("USB"), an IR interface, etc. A monitor 1354, or other type of display device, is also connected to the system bus 1318 via an interface, such as a video adapter 1356. In addition to the monitor, a computer typically includes other peripheral output devices (not shown), such as speakers, printers etc.

The computer 1312 may operate in a networked environment using logical and/or physical connections to one or more remote computers, such as a remote computer(s) 1358. The remote computer(s) 1358 may be a workstation, a server computer, a router, a personal computer, microprocessor based entertainment appliance, a peer device or other common network node, and typically includes many or all of the elements described relative to the computer 1312, although, for purposes of brevity, only a memory storage device 1360 is illustrated. The logical connections depicted include a local area network (LAN) 1362 and a wide area network (WAN) 1364. Such networking environments are commonplace in offices, enterprise-wide computer networks, intranets and the Internet.

When used in a LAN networking environment, the computer 1312 is connected to the local network 1362 through a network interface or adapter 1366. When used in a WAN networking environment, the computer 1312 typically includes a modem 1368, or is connected to a communications server on the LAN, or has other means for establishing communications over the WAN 1364, such as the Internet. The modem 1368, which may be internal or external, is connected to the system bus 1318 via the serial port interface 1352. In a networked environment, program modules depicted relative to the computer 1312, or portions thereof, may be stored in the remote memory storage device 1360. It will be appreciated that the network connections shown are exemplary and other means of establishing a communications link between the computers may be used.

Figure 14:
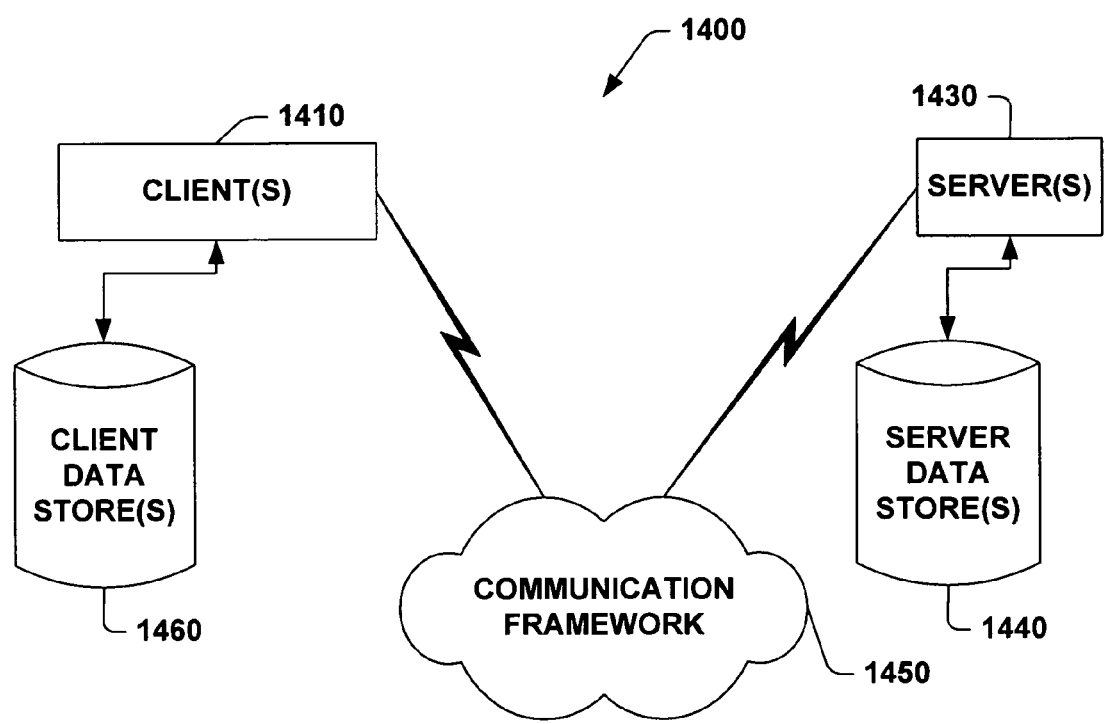
FIG. 14 is a schematic block diagram of an exemplary communication environment in accordance with the present invention.

FIG. 14 is a schematic block diagram of a sample computing environment 1400 with which the present invention can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the present invention, for example. One possible communication between a client 1410 and a server 1430 may be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that dimensionally transforms a pointset, comprising:
    a processing unit;
    a system memory;
    a system bus that couples the system memory to the processing unit and a plurality of system components;
    a receive matrix component coupled to the system bus that receives the pointset; and,
    a transformation component coupled to the system bus that reduces the dimensionality of the pointset via employment of a projection matrix having randomly selected entries from a set comprising +1, 0, and −1, while maintaining a pairwise distance property of the pointset.

2. The system of claim 1, the pointset including n points in d dimensional Euclidean space that may be represented as an n×d input matrix with respective points represented as a row (vector) having d attributes (coordinates), the points being transformed into k dimensional space so as to be representable as a n×k transformed matrix with each point represented as a row (vector) having k attributes (coordinates).

3. The system of claim 2, the projection matrix having randomly selected entries of +1 with probability of 1/2 and −1 with probability of 1/2.

4. The system of claim 2, the projection matrix having randomly selected entries of +1 with probability of 1/6, 0 with probability of 2/3 and −1 with probability of 1/6.

5. The system of claim 2, a range of the pairwise distance property being maintained within an acceptable predetermined percentage.

6. The system of claim 2, the k selected to maintain the pairwise distance property.

7. The system of claim 2, the k being logarithmic in n and independent of d.

8. The system of claim 2, the transformed pointset utilized by an algorithm to compute a distance between a first point and a second point, the first point and the second point belonging to the pointset.

9. The system of claim 1, the transformation component embedding the pointset in different dimensionalities according to the following:
    P is an arbitrary set of n points in d dimensional Euclidian space ($l^d$) represented as a n×d matrix A, given $\epsilon, \beta > 0$, where $\epsilon$ controls accuracy of the embeddings in terms of distance preservation and $\beta$ controls probability of success $$k_0 = \frac{4 + 2\beta}{\epsilon^2/2 - \epsilon^3/3} \log n$$

where, for $k \geq k_0$, R is a d×k projection matrix with $R(i,j) = r_{ij}$, where $\{r_{ij}\}$ includes independent random variables from either one of probability distributions $$r_{ij} = \begin{cases} +1 \\ -1 \end{cases} \text{with probability} \begin{matrix} 1/2 \\ 1/2 \end{matrix}$$

$$r_{ij} = \sqrt{3} \times \begin{cases} +1 & 1/6 \\ 0 & \text{with probability} & 2/3 \\ -1 & 1/6 \end{cases}$$

where $$T = \frac{1}{\sqrt{k}} AR$$

and
embedding from d dimensionality to k dimensionality (f: $l^d \rightarrow l^k$) maps an $i^{th}$ row of A to an $i^{th}$ row of T with probability at least $1-n^{-\beta}$, for all $u,v \in P$ $$(1-\epsilon)||u-v||^2 \leq ||f(u)-f(v)||^2 \leq (1+\epsilon)||u-v||^2.$$

10. A computer implemented system that dimensionally transforms a pointset, comprising:
- a processing unit;
- a system memory;
- a system bus that couples the system memory to the processing unit and a plurality of system components;
- a projection matrix generator coupled to the system bus that receives an input matrix and generates a projection matrix based thereon, the projection matrix having entries of a set of possible binary values of at least +1, 0 and −1; and
- a transformation engine coupled to the system bus that reduces dimensionality of the pointset via employment of the projection matrix while maintaining a pairwise distance property.

11. The system of claim 10, further comprising a receive matrix component that receives a high dimensional pointset and converts the high dimensional pointset into the input matrix.

12. The system of claim 10 further comprising:
- a random generator that randomly provides entries for the projection matrix to the projection matrix generator as entries for the projection matrix according to a probability distribution; and
- a probability distribution that provides the probability distribution to the random generator.

13. The system of claim 10, the transformation engine outputting the reduced dimensionality pointset and the preserved pairwise distance property to a requesting algorithm.

14. The system of claim 13, the requesting algorithm being at least one of an $\epsilon$-approximate nearest neighbor problem, where given an arbitrary point x, for every point $z \in P, ||x-z|| \geq (1-\epsilon)||x-y||$, a point $y \in P$ is found, an approximation algorithm for a version of clustering where the sum of the squares of intra cluster distances is sought to be minimized, and data-stream computations, where a limited memory exists and only single pass over the data (stream) is facilitated.

15. A computer implemented system that transforms a data point, the data point having at least one attribute, the system comprising:
- a processing unit;
- a system memory;
- a system bus that couples the system memory to the processing unit and a plurality of system components;
- a partition component coupled to the system bus that discards a number of the at least one attributes and leaves remaining attributes of the at least one attributes and that partitions the remaining attributes into a first set and a second set;
- a summation component coupled to the system bus that sums the attributes of the first set into a first sum and sums the attributes of the second set into a second sum; and
- a difference component coupled to the system bus that computes a difference of the first sum and the second sum, the difference being an attribute of the transformed data point.

16. The system of claim 15, the system further operative to transform the data point k times to generate k attributes for the transformed data point.

17. The system of claim 16, further comprising a transformed matrix component to generate a transformed matrix having n data points, represented as rows having k attributes, represented as columns.

18. The system of claim 15, the data point being one of n data points represented as rows of an input matrix having d attributes represented as columns.

19. The system of claim 15, the first set referred to as positive attributes and the second set referred to as negative attributes.

20. The system of claim 15, the number of the at least one attributes being discarded being about 2/3 of the at least one attributes.

* * * * *